(12) United States Patent
Jeong et al.

(10) Patent No.: US 12,316,200 B2
(45) Date of Patent: May 27, 2025

(54) FAN MOTOR ASSEMBLY WITH STATOR CORE SUPPORTS

(71) Applicant: LG ELECTRONICS INC., Seoul (KR)

(72) Inventors: Jaehoon Jeong, Seoul (KR); Chaseung Jun, Seoul (KR); Jinwook Cha, Seoul (KR); Charyeom Park, Seoul (KR)

(73) Assignee: LG Electronics Inc., Seoul (KR)

( * ) Notice: Subject to any disclaimer, the term of this patent is extended or adjusted under 35 U.S.C. 154(b) by 239 days.

(21) Appl. No.: 17/923,982

(22) PCT Filed: Sep. 16, 2020

(86) PCT No.: PCT/KR2020/012475
§ 371 (c)(1),
(2) Date: Nov. 8, 2022

(87) PCT Pub. No.: WO2021/225229
PCT Pub. Date: Nov. 11, 2021

(65) Prior Publication Data
US 2023/0188005 A1    Jun. 15, 2023

(30) Foreign Application Priority Data
May 8, 2020 (KR) .......................... 10-2020-0055246

(51) Int. Cl.
*H02K 9/06*        (2006.01)
*H02K 5/173*       (2006.01)
(Continued)

(52) U.S. Cl.
CPC ............. *H02K 9/06* (2013.01); *H02K 5/1732* (2013.01); *H02K 5/207* (2021.01); *H02K 7/083* (2013.01)

(58) Field of Classification Search
CPC .. H02K 9/06; H02K 9/04; H02K 9/02; H02K 7/083; H02K 5/207; H02K 5/1732
(Continued)

(56) References Cited

U.S. PATENT DOCUMENTS

2015/0351599 A1* 12/2015 Park ...................... F04D 29/541
                                                                    310/68 B
2017/0170697 A1*  6/2017 Locke .................... H02K 1/143
(Continued)

FOREIGN PATENT DOCUMENTS

JP        2002-048099          2/2002
JP           6299930           3/2018
(Continued)

OTHER PUBLICATIONS

International Search Report and Written Opinion in International Appln. No. PCT/KR2020/012475, mailed on Feb. 3, 2021, 19 pages (with English translation).
(Continued)

*Primary Examiner* — Michael Andrews
(74) *Attorney, Agent, or Firm* — Fish & Richardson P.C.

(57) ABSTRACT

A motor assembly includes a motor housing having a shaft, a rotor coupled to the shaft, multiple core assemblies along the circumference of the rotor to form a magnetic path, and a first bearing housing supporting one side of the shaft, a housing cover coupled to the motor housing, an impeller installed on the shaft, a diffuser coupled to the housing cover between the impeller and the rotor, and a shroud containing the impeller and the diffuser. The multiple core assemblies are contained independently and spaced apart from each other along the circumference of the rotor. The housing cover includes a second bearing housing supporting the other side of the shaft. The motor housing includes core support portions for supporting the multiple core assemblies
(Continued)

independently, and a first bridge extending from the core support portions to connect the core support portions and the first bearing housing.

19 Claims, 8 Drawing Sheets

(51) Int. Cl.
*H02K 5/20* (2006.01)
*H02K 7/08* (2006.01)

(58) Field of Classification Search
USPC .......................................................... 310/62
See application file for complete search history.

(56) References Cited

U.S. PATENT DOCUMENTS

| | | | |
|---|---|---|---|
| 2017/0231451 A1* | 8/2017 | Oshikiri .................. | H02K 5/26 |
| | | | 15/347 |
| 2018/0351431 A1* | 12/2018 | Kim ........................ | H02K 5/15 |
| 2018/0363679 A1* | 12/2018 | Johnson ................ | F04D 29/667 |
| 2019/0365167 A1* | 12/2019 | Jung ..................... | A47L 9/2889 |

FOREIGN PATENT DOCUMENTS

| | | |
|---|---|---|
| JP | 2018-084151 | 5/2018 |
| JP | 2019-024276 | 2/2019 |
| KR | 2018-0119032 | 11/2018 |

OTHER PUBLICATIONS

Extended European Search Report in European Appln. No. 20934838.2, mailed on Apr. 29, 2024, 11 pages.

\* cited by examiner

FAN MOTOR ASSEMBLY WITH STATOR CORE SUPPORTS

CROSS-REFERENCE TO RELATED APPLICATIONS

This application is a National Phase Application under 35 U.S.C. § 371 of International Application No. PCT/KR2020/012475, filed on Sep. 16, 2020, which claims the benefit of Korean Application No. 10-2020-0055246, filed on May 8, 2020, the content of which are incorporated by reference herein in their entirety.

TECHNICAL FIELD

The present disclosure relates to a motor assembly.

BACKGROUND ART

In general, a motor is a device that realizes driving force by interaction between a stator and a rotor, and the overall structure of the stator and the rotor is basically the same.

However, a type of the motor is divided according to a principle that the rotor rotates due to interaction between the stator and the rotor. In addition, the type of the motor is also divided according to the type or phase of power applied to a stator coil. Also, the type of the motor is divided according to a method in which the stator coil is wound. For example, there are a DC variable voltage motor and an AC 3-phase induction motor.

To describe a general structure of the motor, a shaft defining a rotation axis, a rotor coupled to the shaft, and a stator core fixed inside the housing are provided, and the stator is installed at a predetermined interval along the circumference of the rotor.

The stator core is provided with teeth, and coils are wound around the teeth to define a rotating magnetic field, and induce electrical interaction with the rotor to induce rotation of the rotor.

The coil is divided into concentrated winding and distributed winding depending on a winding method, the centralized winding is a winding method in which the coil is concentrated in one slot, and the distributed winding is a winding method in which the coil is divided and wound around two or more slots.

In the case of the concentrated winding, copper loss may be reduced while reducing the amount of winding compared to the distributed winding, but the coil is excessively concentrated in the slot, and thus a change in magnetic flux density is large, and core loss or iron loss, that is, power loss of an iron core increases. Accordingly, the coil wound using the concentrated winding method is generally used in small motors.

Recently, various developments have been made for motors used in various home appliances (e.g., hair dryers or vacuum cleaners) in order to ensure assembly properties, ensure the area of a flow path, and resolve spatial constraints that occur according to demands for miniaturization and performance improvement.

The cited reference (U.S. Ser. No. 16/011,823, published on Dec. 20, 2018) discloses a brushless motor including a C-type stator core. The C-type stator core includes a protrusion for contact with a frame to restrain radial motion. The C-type stator core has a structure for reducing leakage flux and has a short magnetic flux path. The C-type stator core disclosed in the cited reference is fixed to a slot formed in a frame through which a shaft passes.

However, as described above, when the stator core is fixed to the frame through which the shaft passes, vibration caused by rotation of the shaft is transmitted to the frame, and coupling force of the stator core is weakened, which causes deterioration of the durability of the motor, and in this case, it is not easy to ensure a flow path space for cooling of the inside of the core.

DISCLOSURE

Technical Problem

According to an object of the present disclosure is to resolve the aforementioned problem.

One of the various objects of the present disclosure is to provide a motor assembly for increasing durability by reducing the size and weight of a fan motor and improving structural stability.

One of the various objects of the present disclosure is to provide a housing structure for independently configuring cores in respective phases to reduce the weight of a motor and ensure an internal space thereof and fixing each independent core.

One of the various objects of the present disclosure is to provide a motor assembly for increasing a suction force by ensuring an area of a flow path inside a fan motor and ensuring the cooling performance of the motor.

One of the various objects of the present disclosure is to provide a motor assembly for improving the cooling efficiency of a core by forming an inclined surface on a cover of a motor housing and guiding some of outside air introduced through a suction part of a shroud to each independent core.

Technical Solution

Various embodiments to achieve an object of the present disclosure may provide a motor assembly including a motor housing for ensuring the area of a flow path inside a motor by forming a C-type independent core and a support at a position corresponding to the C-type independent core.

An exemplary embodiment of the present disclosure may provide a motor assembly for facilitating assembly and improving the durability of a motor by fixing a C-type independent core to a motor housing.

An exemplary embodiment of the present disclosure may provide a motor assembly for improving cooling performance of the motor assembly by forming an inclined surface on a cover of a motor housing and guiding outside air introduced into the motor assembly to each independent core.

According to an exemplary embodiment of the present disclosure, a motor assembly includes a shaft defining a rotation axis of a motor, a rotor coupled to the shaft, a plurality of core assemblies provided along a circumference of the rotor to form a magnetic path, a motor housing that includes a first bearing housing supporting one side of the shaft and in which the plurality of core assemblies are spaced apart from each other at a predetermined interval along the circumference of the rotor and are independently accommodated, a housing cover coupled to the motor housing and including a second bearing housing supporting another side of the shaft, an impeller installed and rotating on the shaft, a diffuser coupled to the housing cover and provided between the impeller and the rotor, and a shroud accommodating the impeller and the diffuser and having a suction part formed therein to allow outside air to be introduced, wherein the motor housing includes a plurality of core supports on which the plurality of core assemblies are each independently accommodated, and a first bridge extending from the core support toward a radially inner side of the shaft and connecting the core support and the first bearing housing.

The motor housing may further include a first coupler in contact with the housing cover and provided in a hollow ring shape, and the plurality of core supports may extend in a longitudinal direction of the shaft from the first coupler.

One side of the plurality of core supports may be in contact with the first coupler and another side of the plurality of core supports may be connected to the first bearing housing through the first bridge.

The first bridge may include a first hole for forming a flow path for allowing outside air introduced through the suction part to pass through the core assembly.

The core assembly may include a core including two pole arms and a connector connecting the two pole arms, a coil, and an insulator insulating between the core and the coil.

The core support may include an accommodation groove into which the insulator is inserted, and a coupling groove that is recessed in a direction in which a width of the accommodation groove is widened and to which the insulator is coupled. The insulator may include a protrusion inserted into the coupling groove in the longitudinal direction of the shaft. The coupling groove may be formed in the longitudinal direction of the accommodation groove.

The core support may further include a second hole formed in a longitudinal direction of the core support.

The housing cover may include a second coupler in contact with the motor housing and provided in a hollow ring shape, and a second bridge connecting an inner circumference of the second coupler and the second bearing housing.

The second bridge may extend from the inner circumference of the second coupler to the second bearing housing toward a radially inner side of the shaft, and the housing cover may be coupled to the motor housing to be positioned on an upper portion between the plurality of core assemblies.

The second bridge may define an inclined surface in a longitudinal direction of the shaft and guide at least some of outside air introduced through the suction part to the core assembly.

The features of the above-described embodiments may be implemented in combination in other embodiments unless contradictory or exclusive to other embodiments.

According to another embodiment, a motor assembly includes a shaft defining a rotation axis of a motor, a rotor coupled to the shaft, a plurality of core assemblies provided to be spaced apart from each other along a circumference of the rotor to form a magnetic path, a motor housing that is connected to one side of the shaft and in which each of the core assemblies is independently accommodated, a housing cover connected to another side of the shaft and coupled to the motor housing, an impeller installed and rotating on the shaft, a diffuser coupled to the housing cover and provided between the impeller and the rotor, and a shroud accommodating the impeller and the diffuser and having a suction part formed therein to allow outside air to be introduced, wherein the motor housing includes a first coupler coupled to the housing cover and provided in a hollow ring shape, a core support extending from the first coupler in a longitudinal direction of the shaft and supporting the core assembly, a first bearing housing accommodating a first bearing for supporting the shaft and provided at a center of the motor housing, and a first bridge extending from the core support toward a radially inner side of the shaft and connecting the core support and the first bearing housing.

The second bridge may be provided in a plural number and may be provided to define a predetermined slope in the longitudinal direction of the shaft.

The motor housing may include a first hole that is formed in the first bridge and through which outside air introduced into the shroud is discharged.

The core support may include an accommodation groove in which the core assembly is accommodated, and a coupling groove provided in a longitudinal direction of the accommodation groove and recessed in a direction in which a width of the accommodation groove is widened.

The motor housing may include a second hole that is formed in the core support and through which outside air introduced through the shroud is discharged.

Advantageous Effects

According to various embodiments of the present disclosure, the durability of a fan motor may be improved by fixing a C-type independent core to a motor housing, and the cooling performance of the fan motor may be improved by ensuring the area of a flow path inside the motor housing.

According to various embodiments of the present disclosure, it may be possible to improve the cooling efficiency of a core by guiding some of outside air introduced into a motor assembly to each C-type independent core.

Accordingly, according to various embodiments of the present disclosure, the durability of a small high-speed fan motor may be improved, and the cooling performance and suction efficiency of a fan motor may be improved by ensuring the area of a flow path inside the fan motor.

The effects of the present disclosure are not limited to those described above, and other effects not mentioned will be clearly recognized by those skilled in the art from the following description.

BEST MODE

Hereinafter, specific embodiments of the present disclosure will be described with reference to the drawings. The following detailed description is provided to provide a comprehensive understanding of the methods, apparatus, and/or systems described herein. However, this is merely an example and the present disclosure is not limited thereto.

In the following description of the present disclosure, a detailed description of known technology incorporated herein will be omitted when it may make the subject matter of the present disclosure unclear. The terms used in the specification are defined in consideration of functions used in the present disclosure, and may be changed according to the intent or conventionally used methods of clients, operators, and users. Accordingly, definitions of the terms should be understood on the basis of the entire description of the present specification. The terminology used herein is for the purpose of describing particular embodiments only and is not intended to be limiting of the present disclosure. As used herein, unless explicitly used otherwise, expressions in the singular include the meaning of the plural. In this description, expressions such as "comprising" or "including" are intended to indicate certain features, numbers, steps, operations, elements, some or a combination thereof, and but do not preclude the presence or addition of one or more other features, numbers, steps, operations, elements, some or a combination thereof.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms.

Figure 1:
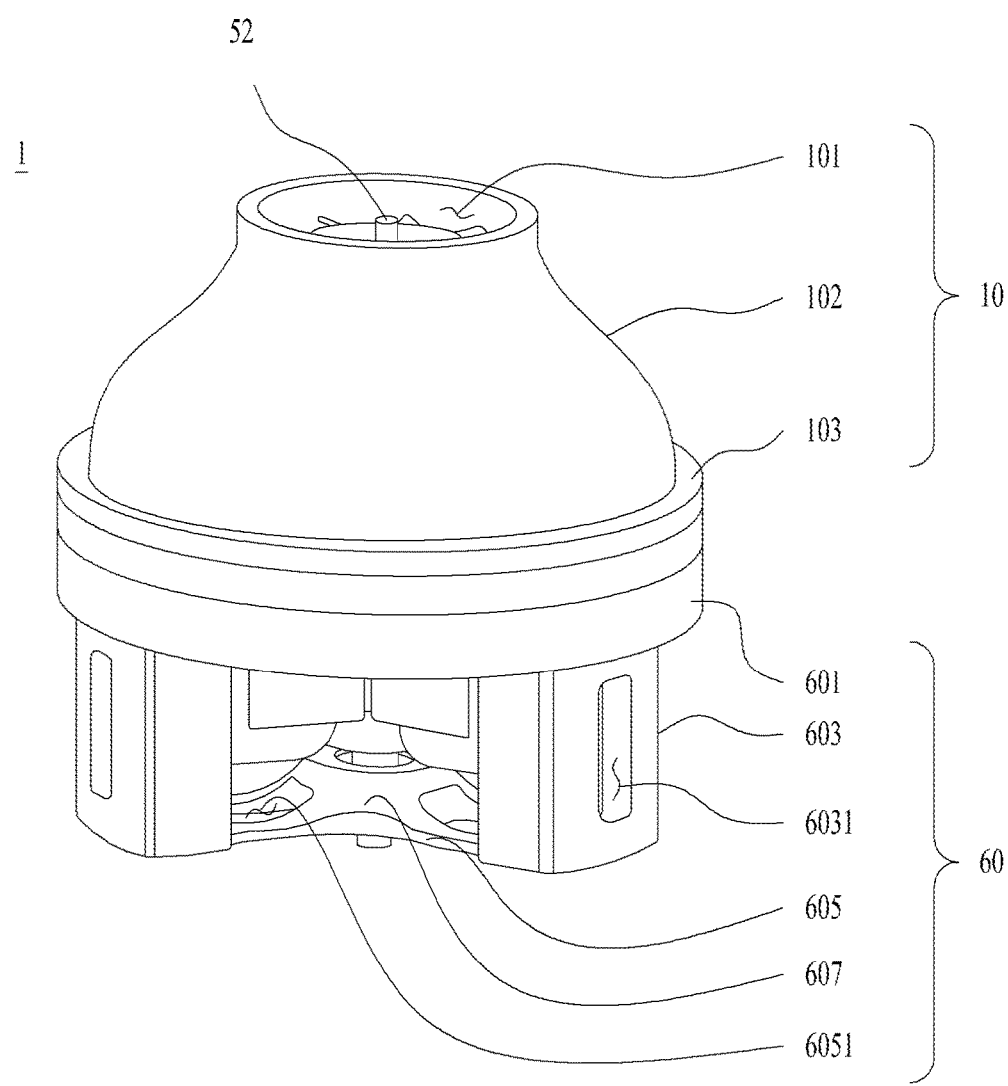
FIG. 1 is a perspective view of a motor assembly according to an embodiment of the present disclosure.
Figure 2:
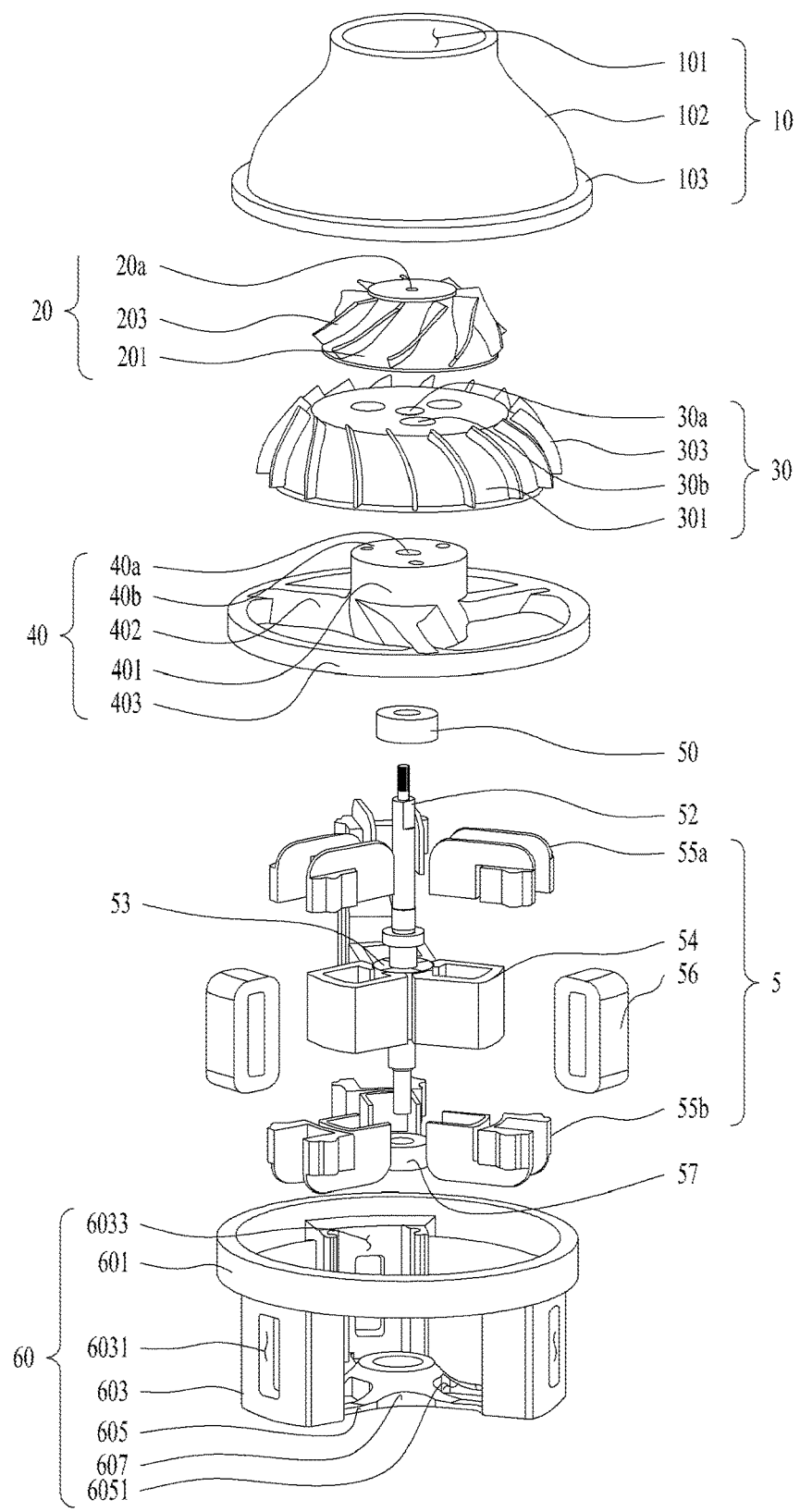
FIG. 2 is an exploded perspective view of a motor assembly according to an embodiment of the present disclosure.

FIG. 1 is a perspective view of a motor assembly according to an embodiment of the present disclosure. FIG. 2 is an exploded perspective view of a motor assembly according to an embodiment of the present disclosure.

Hereinafter, embodiments of the present disclosure will be described with reference to FIGS. 1 and 2.

A motor assembly 1 according to an embodiment of the present disclosure may be used in small home appliances. For example, the motor assembly 1 may be used in a cleaner. The cleaner may have a canister type in which a nozzle for sucking dust and a dust collector for storing dust are connected with a hose, and a handy type in which a nozzle and a dust collector are provided as a single module. In the case of the handy type, since cleaning is performed while a user grips an entire cleaner module, overall miniaturization and weight reduction of the cleaner are required.

The motor assembly 1 may be applied to a small home appliance to satisfy the above-mentioned requirements.

The motor assembly 1 according to the present embodiment may include a shroud 10, an impeller 20, a diffuser 30, a housing cover 40, a core assembly 5, and a motor housing 60.

The shroud 10 may suck and guide outside air. The shroud 10 may define an upper outer appearance of the motor assembly.

The shroud 10 may include a suction part 101, an inclined portion 102, and a third coupler 103. The suction part 101 may be provided in a hollow ring shape at an upper end of the shroud 10. Since outside air is introduced through the suction part 101, a diameter of the suction part 101 may be designed in consideration of a diameter of the impeller 20.

The shroud 10 may include the inclined portion 102 extending while defining a gentle curve on the suction part 101. The inclined portion 102 may be provided in a shape in which a diameter increases from the suction part 101 in an axial direction. The inclined portion 102 may define a gentle curve in order to minimize a factor acting as a resistance to a flow of air introduced through the suction part 101.

The suction part 101 may be formed at one end of the inclined portion 102, and the third coupler 103 may be formed at the other end of the inclined portion 102. The third coupler 103 may extend radially outward from the other end of the inclined portion 102 to form a predetermined thickness. The third coupler 103 may be in contact with one surface of a second coupler 403 of the housing cover 40 to be described later to couple the shroud 10 and the housing cover 40. Needless to say, various structures for coupling the third coupler 103 and the second coupler 403 within the thickness of the third coupler 103 may be applied.

The impeller 20 may include a through hole 20a, a blade 203, and an impeller body 201. The impeller 20 may be installed on one side of the shaft 52. In more detail, the impeller 20 may be installed opposite to the other side of the shaft 52 on which the rotor 53 is installed based on an axial direction of the shaft 52.

The impeller 20 may be fixed to one side of the shaft 52 by coupling the shaft 52 defining a rotation axis of the motor to the through hole 20a. The impeller 20 may be fixed to the shaft 52 in various ways, for example, by a screw fastening method.

The impeller body 201 may be provided in a shape in which the circumference is widened in an axial direction of the shaft 52. The blade 203 may extend radially outward of the shaft 52 from an outer surface of the impeller body 201. The blade 203 may be provided along a longitudinal direction of the impeller body 201. The blade 203 may be disposed to be spaced apart in a circumferential direction on the outer surface of the impeller body 201.

The impeller 20 of the present embodiment may be provided as a four-flow impeller that sucks in gas, such as air, in an axial direction of the shaft 52 and discharges the gas in an oblique direction between a centrifugal direction and an axial direction.

That is, the gas flowing into the shroud 10 through the suction part 101 may be guided toward the motor housing 60 along an outer surface of the impeller body 201 by rotation of the blade 203. However, embodiments of the present disclosure are not limited thereto, and the impeller 20 may be provided as a centrifugal impeller that sucks in gas in an axial direction and discharges the gas in a centrifugal direction. However, hereinafter, for convenience of explanation, the impeller 20 will be mainly described in the case of a four-flow type impeller.

The diffuser 30 may include a through hole 30a, a coupling hole 30b, a diffuser body 301, and a vane 303. The diffuser 30 may convert a dynamic pressure of the gas passing through the impeller 20 into a static pressure.

The diffuser 30 may be coupled to the shaft 52 by inserting the shaft 52 into the through hole 30a, and the diffuser 30 may be provided between the impeller 20 and the rotor 53. Accordingly, the through hole 30a may be provided at a position communicating with the through hole 20a of the impeller 20 when the impeller 20 and the diffuser 30 are coupled to the shaft 52. In addition, the coupling hole 30b may be configured to couple the diffuser 30 to the housing cover 40.

The diffuser body 301 may be provided in a shape in which the circumference is widened in an axial direction of the shaft 52. The vane 303 may extend radially outward of the shaft 52 from an outer surface of the diffuser body 301. The vane 303 may be provided along a longitudinal direction of the diffuser body 301. The vane 303 may be disposed to be spaced apart from each other in a circumferential direction on the outer surface of the diffuser body 301.

According to this structure, the gas flowing into the shroud 10 through the suction part 101 may be guided to a space between the shroud 10 and the diffuser 30 by the impeller 20, and gas flowing between an inner surface of the shroud 10 and the diffuser 30 may be guided toward the core assembly 5 by the plurality of vanes 303.

The housing cover 40 may include a through hole 40a, a coupling hole 40b, a second bearing housing 401, a second bridge 402, and the second coupler 403.

The through hole 40a may be a component into which the shaft 52 is inserted, and when the housing cover 40, the diffuser 30 and the impeller 20 are coupled to the shaft 52, the through hole 40a may be formed at a position at which the through hole 20a of the impeller and the through hole 30a of the diffuser communicate with each other.

The coupling hole 40b may be a component for coupling the diffuser 30 and the housing cover 40, and when the diffuser 30 is coupled to the housing cover 40, the coupling hole 40b may be formed at a position communicating with the coupling hole 30b of the diffuser.

The second bearing housing 401 may be a component for accommodating a second bearing 50 for supporting one side of the shaft 52, and may be provided in the center of the housing cover 40. The second bearing 50 may be, for example, a ball bearing, and the shaft 52 may have a step difference recessed toward a radially inner side on the outer surface of the shaft 52 to support the second bearing 50. Alternatively, needless to say, the shaft 52 may have a step difference protruding outward in the radial direction on the outer surface of the shaft 52 to support the second bearing 50.

The second coupler 403 may extend radially outwardly of the shaft 52 to form a predetermined thickness. One surface of the second coupler 403 may be in contact with the third coupler 103 of the shroud 10, and the other surface of the second coupler 403 may be in contact with the first coupling part 601 of the motor housing 60, and thus the shroud 10, the housing cover 40, and the motor housing 60 may be coupled to each other. Needless to say, various structures for the above-described coupling may be applied within the thickness of the second coupler 403.

The second bridge 402 may connect the second bearing housing 401 and the second coupler 403. The plurality of second bridges 402 may be provided for structural stability of the housing cover 40, and may be formed to a predetermined thickness to ensure the rigidity of the second bridge 402.

When the plurality of second bridges 402 are provided while forming a predetermined thickness, this may act as a resistance to a flow of outside air introduced through the suction part 101. Therefore, the second bridge 402 according to the present embodiment may form a predetermined slope in the longitudinal direction of the shaft 52. As the second bridge 402 is provided to be inclined, a portion acting as a resistance to the flow of outside air introduced through the suction part 101 may be minimized. In addition, it may be possible to cool heat generated by current flowing in a coil 56 by guiding the flow toward the core assembly 5.

The diffuser 30 may be formed integrally with the housing cover 40, and in detail, may be coupled to the housing cover 40 after being separately manufactured from the housing cover 40, The rotor 53 may be provided to surround a part of the outer surface of the shall 52. Due to electromagnetic interaction between the rotor 53 and the core assembly 5, the shaft 52 may rotate, and as the shaft 52 rotates, the impeller 20 coupled to the shaft 52 may also rotate with the shaft 52, and outside air may be sucked into the motor assembly 1 according to rotation of the impeller 20.

The core assembly 5 may include a core 54, insulators 55a and 55b, and the coil 56. The motor according to the present embodiment may be exemplified as a brushless direct current motor (BLDC). Accordingly, the core assembly 5 according to the present embodiment may be disposed outside the rotor 53.

The plurality of cores 54 may be provided along the circumference of the rotor 53 to form a magnetic path. The core 54 according to the present embodiment may be an independent C-type core including two pole arms that are spaced apart from each other and extend in the radial direction of the shaft 52 and a yoke connecting the two pole arms.

The insulators 55a and 55b may be coupled to the core 54 to surround the pole arms and the yoke of the core 54 and may insulate between the core 54 and the coil 56. The insulator may include the first insulator 55a and the second insulator 55b to be easily assembled on the core 54.

The motor housing 60 may include the first coupling part 601, a core support 603, the first bridge 605, and a first bearing housing 607.

The first coupling part 601 may be a component for coupling with the second coupler 403 of the housing cover 40 as described above, and may be provided in a hollow ring shape. The core assembly 5 may be coupled to the motor housing 60 in the axial direction of the shaft 52 while passing through the first coupling part 601.

The core support 603 may be a component for supporting the core assembly 5, and may extend in the longitudinal direction of the shaft 52 in the first coupling part 601. An accommodation groove 6033 may be formed on a surface of the core support 603, which faces the shaft 52. The core assembly 5 may be accommodated in the seating groove 6033.

A second hole 6031 may be formed in the core support 603. The core assembly 5 may be cooled by discharging heat generated by current flowing in the coil 56 through the second hole 6031 or discharging outside air introduced through the suction part 101 into the second hole 6031 through the core assembly 5.

The first bearing housing 607 may be a component in which a first bearing 57 for supporting one side of the shaft 52 is accommodated. Therefore, the first bearing housing 607 may be formed at the center of the motor housing 60. The first bearing 57 may be, for example, a ball bearing. Since the first bearing 57 and the second bearing 50 support both sides of the shaft 52, the shaft 52 may rotate stably.

The first bridge 605 may extend from the core support 603 toward a radially inner side of the shaft 52 to connect the first bearing housing 607 and the core support 603. In the above structure, one side of the plurality of core supports may be in contact with the first coupling part 601, and the other side of each of the plurality of core supports may be connected to the first bearing housing 607 through the first bridge 605.

The plurality of first bridges 605 may be provided for structural stability of the motor housing 60, and may be formed to a predetermined thickness in order to ensure the rigidity of the second bridge 402.

A first hole 6051 may be formed in the first bridge 605. The first hole 6051 may be formed within the thickness of the first bridge 605, and when the plurality of first bridges 605 is provided while forming a predetermined thickness, this may act as a resistance to a flow passing through the inside of the motor housing 60 in a longitudinal direction of the shaft 52. Therefore, in the first bridge 605 according to the present embodiment, the portion that acts as a resistance to the flow when the first hole 6051 is formed in the longitudinal direction of the first bridge 605 may be minimized, and simultaneously the rigidity of the motor housing 60 may be ensured.

Figure 3:
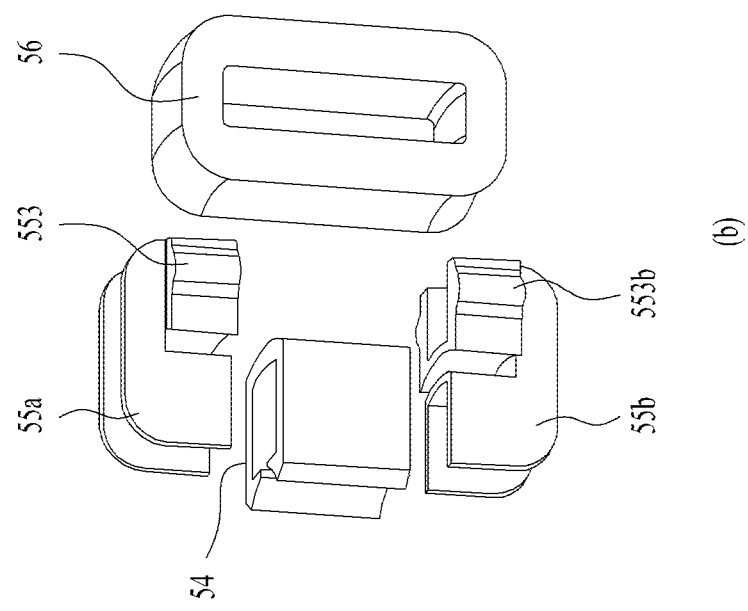
FIG. 3 is a diagram showing a core assembly according to an embodiment of the present disclosure.
Figure 3:
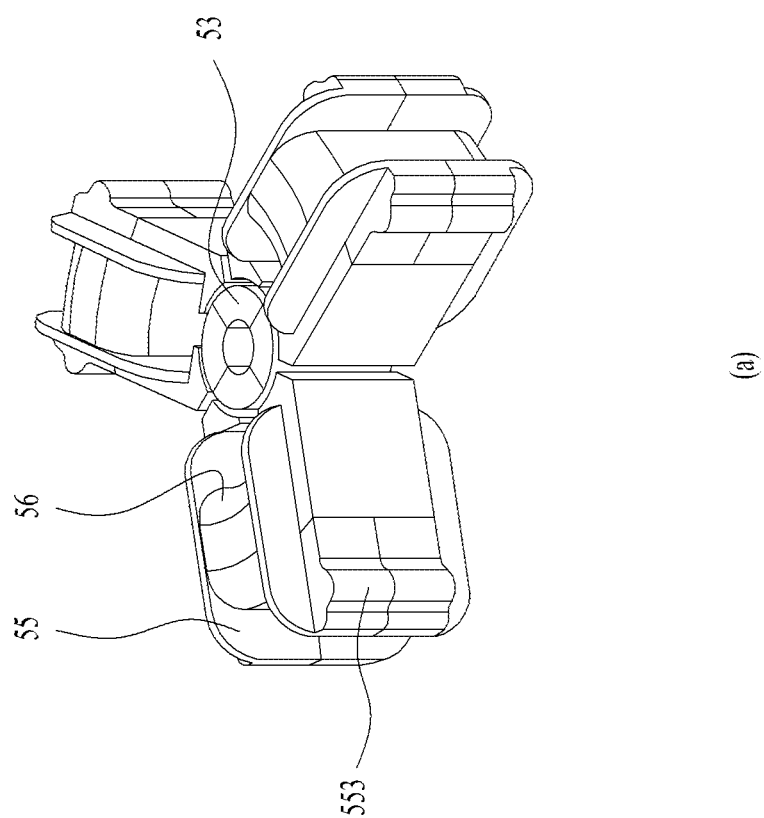
Figure 4:
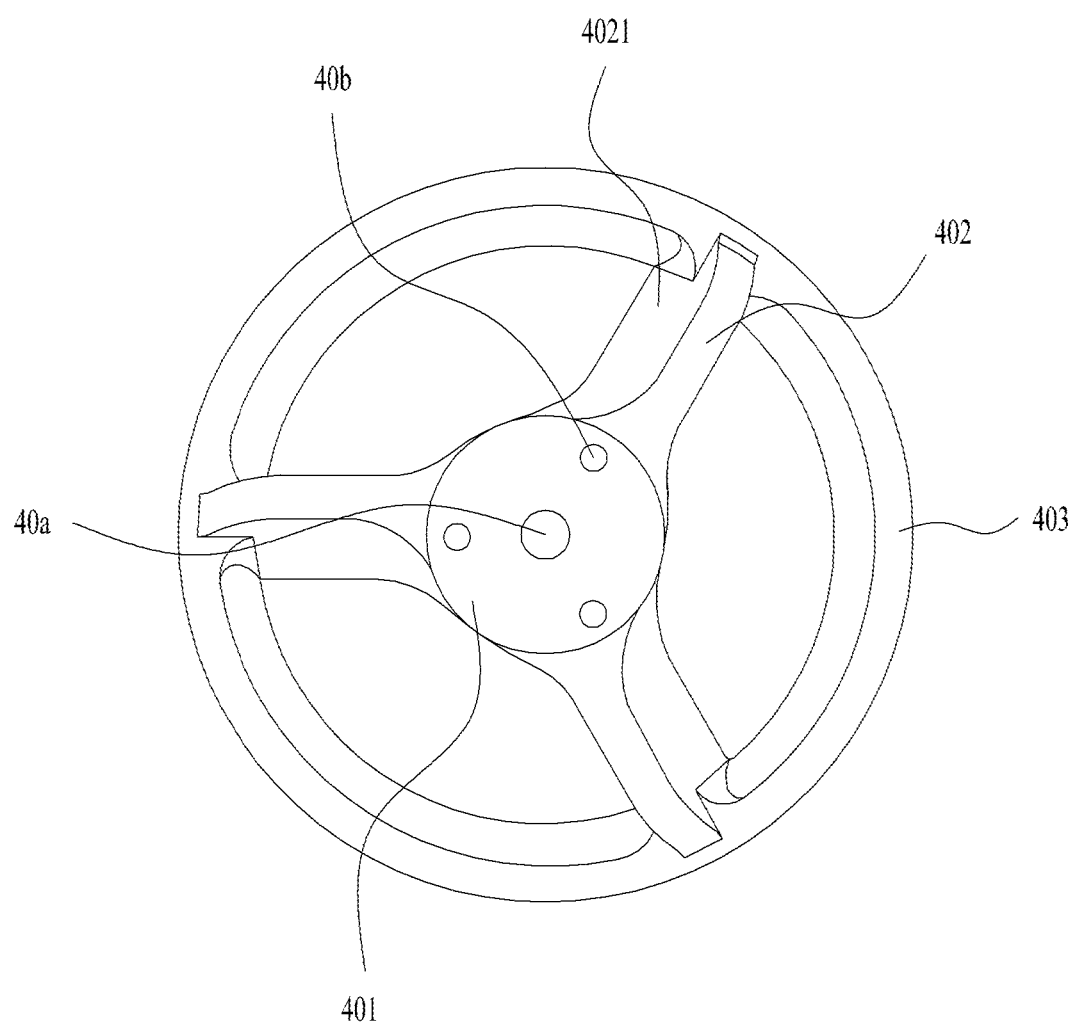
FIG. 4 is a diagram showing a housing cover according to an embodiment of the present disclosure.
Figure 5:
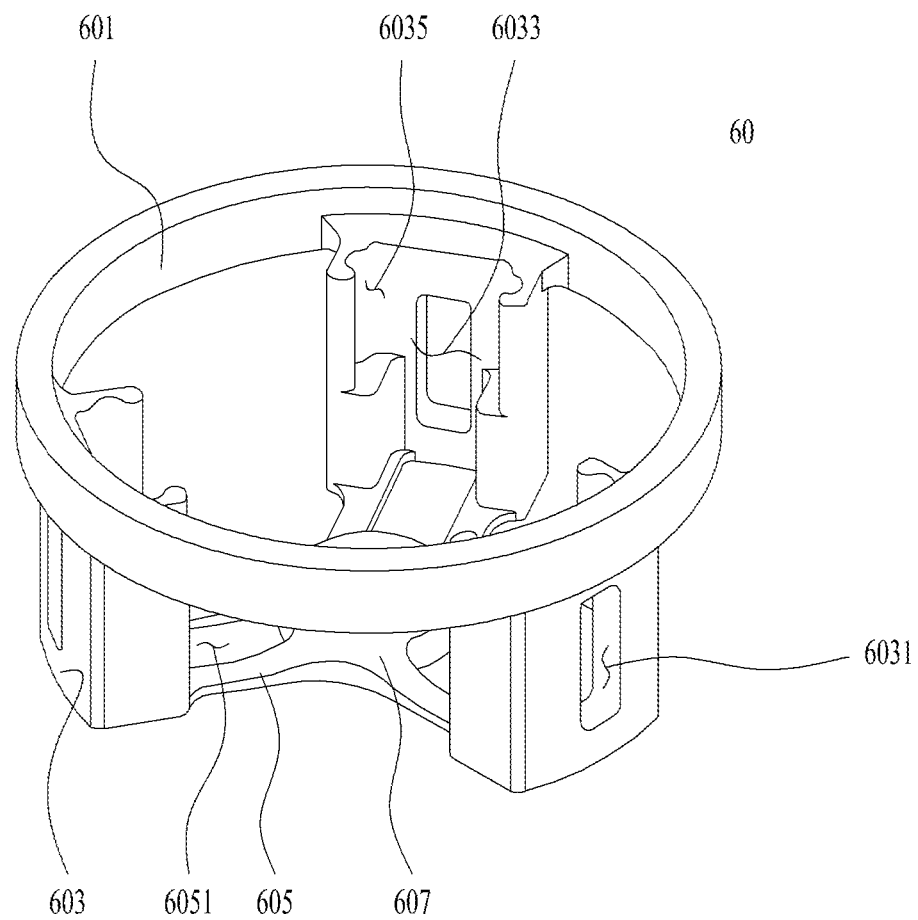
FIG. 5 is a diagram showing a motor housing according to an embodiment of the present disclosure.
Figure 6:
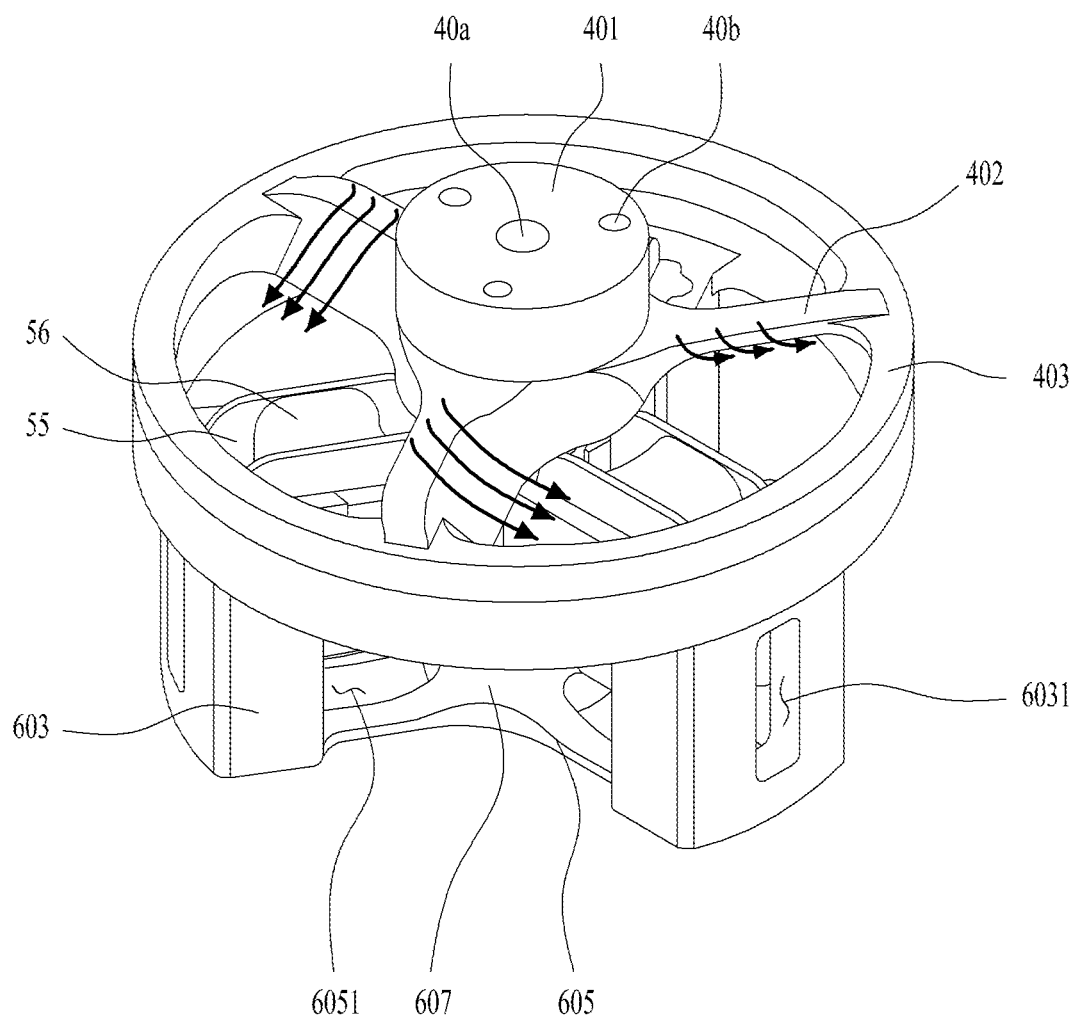
FIG. 6 is a diagram showing a state in which a core assembly, a housing cover, and a motor housing are coupled to each other according to an embodiment of the present disclosure.

FIG. 3 is a diagram showing a core assembly according to an embodiment of the present disclosure. FIG. 4 is a diagram showing a housing cover according to an embodiment of the present disclosure. FIG. 5 is a diagram showing a motor housing according to an embodiment of the present disclosure. FIG. 6 is a diagram showing a state in which a core assembly, a housing cover, and a motor housing are coupled to each other according to an embodiment of the present disclosure.

Hereinafter, a description will be given with reference to FIGS. 3 to 6.

Referring to FIG. 3A, the core assembly 5 according to the present embodiment may include the core 54, the insulator 55, and the coil 56 as described above. The plurality of core assemblies 5 may be spaced apart from an outer circumference of the rotor 53 by a predetermined distance and may be provided along the circumference of the rotor 53, and in the present embodiment, three core assemblies may be provided.

Referring to FIG. 3B, the insulator 55 may include the first insulator 55a and the second insulator 55b. The first insulator 55a and the second insulator 55b may be formed as independent parts that are coupled to surround upper and lower portions of the core 54, respectively. As described above, when the insulators are provided as independent components and are coupled to each other to surround the core, the insulators may be easily assembled to the core.

The insulator 55 may include a fixing part 553. The fixing part 553 may be provided to protrude from the outer circumference of the insulator 55. Since the fixing part 553 is coupled to the coupling groove 6035 of the motor housing 60, the core assembly 5 may be firmly fixed to the motor housing 60.

Referring to FIG. 4, the housing cover 40 according to the present embodiment may include the second bearing housing 401, the second bridge 402, and the second coupler 403.

The second bridge 402 may stably connect the second coupler 403 and the second bearing housing 401, and may be formed to a predetermined thickness for the durability of the motor assembly. The second bridge 402 may be located on a path through which outside air introduced from the suction part moves. Therefore, the second bridge 402 may act as a resistance to the flow. Therefore, the second bridge 402 according to the present embodiment may form an inclined surface 4021 in the longitudinal direction of the shaft 52 to ensure the durability of the motor assembly and minimize the portion acting as a resistance to the flow at the same time.

In detail, the second bridge 402 may extend from an inner circumference of the second coupler 403 to the second bearing housing 401 toward a radially inner side of the shaft 52. The second bridge 402 may be provided on an upper portion between the plurality of core assemblies. In another aspect, the housing cover 40 may be coupled to the motor housing 60 in such a way that the second bridge 402 is positioned on top between the plurality of core assemblies.

Referring to FIG. 6 in the above structure, at least some of outside air introduced through the suction part 101 may be guided to the core assembly 5 along the inclined surface 4021, and the core assembly 5 heated by current flowing in the coil may be cooled to improve the efficiency of the motor assembly.

Needless to say, it may be possible to improve the efficiency of the motor assembly by minimizing the part acting as a resistance to the flow of outside air passing through the motor assembly through the inclined surface 4021.

In detail, referring to FIG. 5, the first hole 6051 may be formed in the first bridge 605 of the motor housing 60, and the second hole 6031 may be formed in the core support 603. The first hole 6051 and the second hole 6031 may define a discharge port through which outside air introduced through the suction part 101 is discharged.

The accommodation groove 6033 in which the core assembly 5 is accommodated and the coupling groove 6035 coupled to the core assembly 5 may be formed inside the core support 603. The coupling groove 6035 may be recessed in a direction in which the width of the accommodation groove 6033 is widened, and may be formed in a longitudinal direction of the accommodation groove 6033. The fixing part 553 of the core assembly 5 described above may be inserted into the coupling groove 6035 in the longitudinal direction of the shaft 52 in such a way that the core assembly 5 is fixed to the motor housing 60.

The first bridge 605 may connect the first bearing housing 607 and the core support 603, and fix the position of the first bearing housing 607. Thus, the first hearing housing 607 may be axially aligned with the second bearing housing 401.

The above-described core support 603 and the first bridge 605 need to be provided for the durability of the motor assembly, but may act as a resistance to a flow passing through the motor.

Therefore, the first hole 6051 may be formed in the first bridge 605, and the second hole 6031 may be provided in the core support 603, and thus it may be possible to smoothly discharge the introduced outside air and improve the cooling efficiency of the motor assembly.

Needless to say, the outside air introduced through the suction part 101 may also be discharged into a space between the core supports 603 and a space between the first bridges 605.

Figure 7:
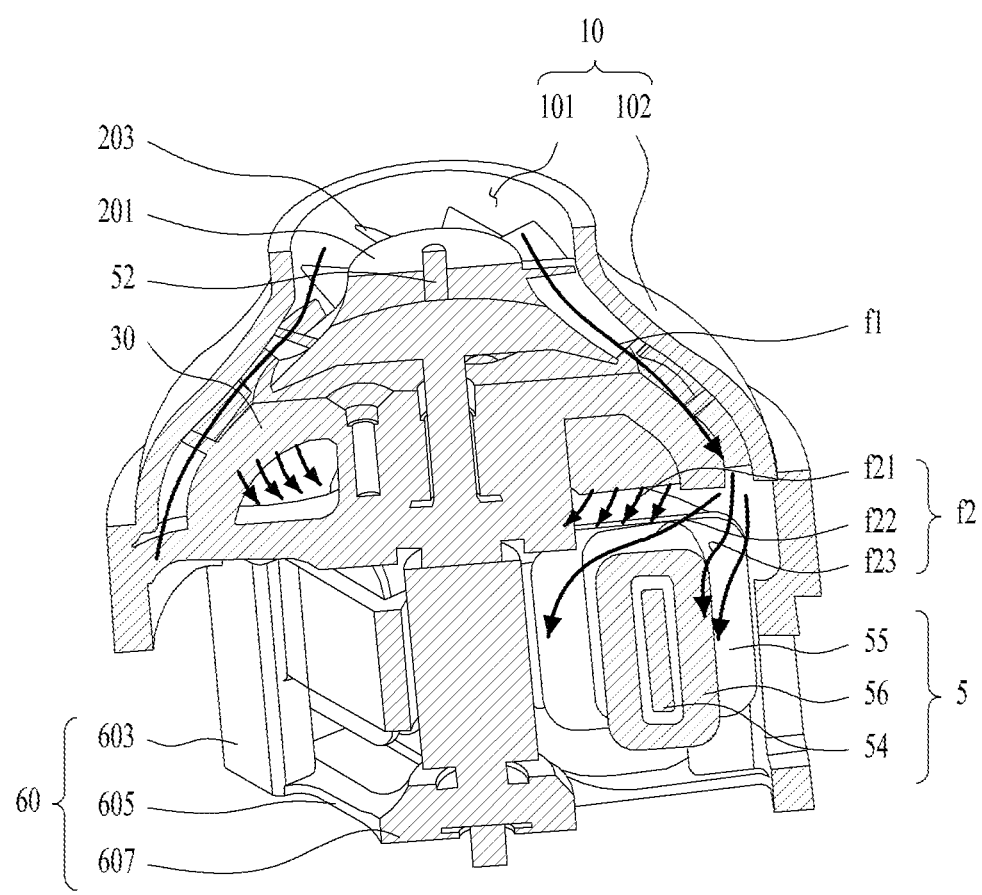
FIGS. 7 and 8 are diagrams showing a flow in a motor assembly according to an embodiment of the present disclosure.
Figure 8:
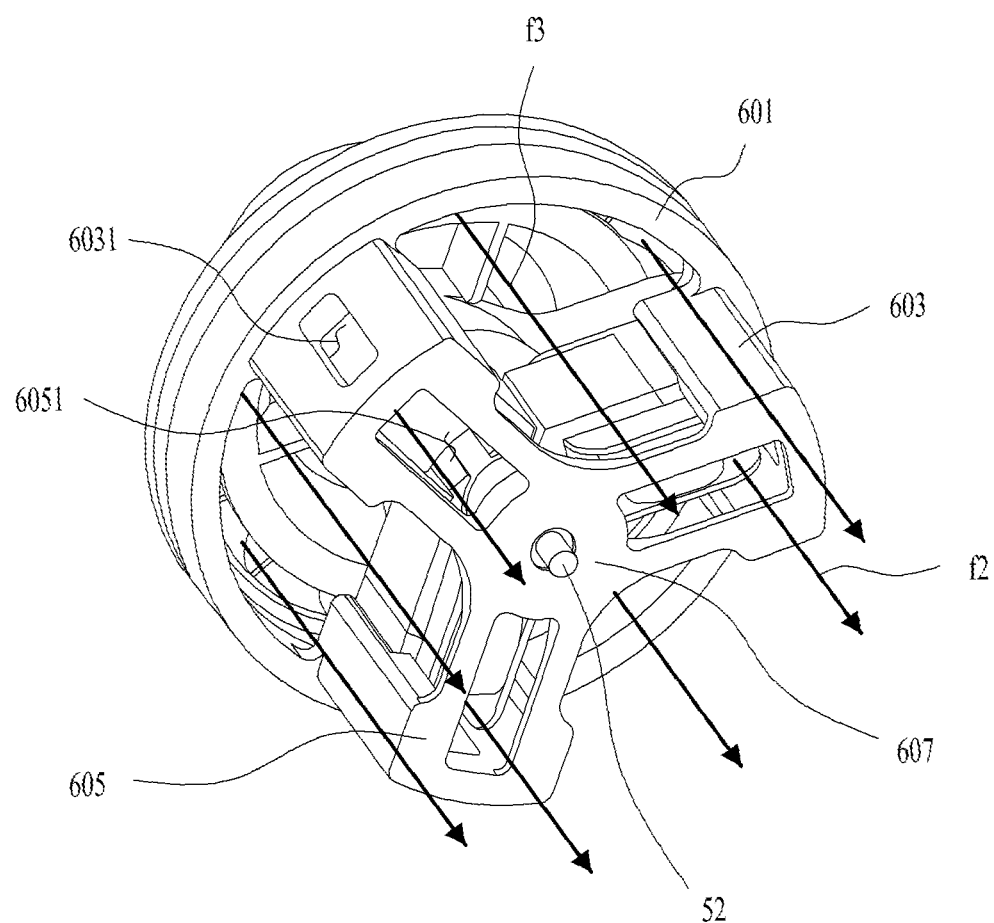

FIGS. 7 and 8 are diagrams showing a flow in a motor assembly according to an embodiment of the present disclosure.

Hereinafter, referring to FIGS. 7 and 8, while the impeller 20 rotates, a flow in which outside air is introduced into the suction part 101 may occur. The outside air introduced through the suction part 101 may move along a space between the inner surface of the inclined portion 102 of the shroud 10 and the diffuser 30. A flow moving between the inner surface of the shroud the inclined portion 102 and the diffuser 30 described above may be defined as a first flow f1.

The first flow f1 may be divided at the housing cover 40 and the motor housing 60 to define a second flow f2.

In more detail, the second flow f2 may include a flow f21 guided along the inclined surface 4021 formed on the second bridge 402 of the housing cover 40, a flow f22 that is divided by a step difference at a portion at which the first coupling part 601 and the core support 603 of the motor housing 60 are connected and passes between the inside of the core assembly 5 and the rotor 53, and a flow f23 passing between the outside of the core assembly 5 and the inside of the core support 603

Since the flows f22 and f23 move along the coil 56 wound around the core assembly 5, the flows f22 and f23 may be divided from the first flow f1 by the core assembly 5, needless to say.

That is, the second flow f2 may be guided (f21) to the core assembly 5 by the inclined surface 4021 of the second bridge 402, may be divided by the step difference at the portion at which the first coupling part 601 and the core support 603 are connected and may pass between the inner side of the core assembly 5 and the rotor 53 (f22), and may pass between an outer side of the core assembly 5 and an inner side of the core support 603 (f23), thereby improving the cooling efficiency of the motor assembly.

Therefore, outside air introduced through the suction part 101 may form the first flow f1 passing between the inner surface of the inclined portion 102 of the shroud 10 and the diffuser 30, and some of the first flow f1 may form the second flow f2, pass through the core assembly 5, and may then be discharged through the first hole 6051 or the second hole 6031 formed in the first bridge 605. The remaining part of the first flow f1 may form a third flow f3 and may be discharged into a space between the core supports 603.

Needless to say, some of the second flow f2 may also be discharged through the same path as the third flow f3. For example, some of a flow moving along the inclined surface 4021 of the housing cover may be guided to the core assembly 5, and the remaining part may be combined with the third flow f3 and discharged.

Although various embodiments of the present disclosure have been described in detail above, those of ordinary skill in the art to which the present disclosure pertains will understand that it is possible to make various modifications to the above-described embodiments without departing from the scope of the present disclosure. Therefore, the scope of the present disclosure should not be limited to the described embodiments, and should be defined by the claims described below as well as the claims and equivalents.

The invention claimed is:

1. A motor assembly comprising:
a shaft defining a rotation axis of a motor;
a rotor coupled to the shaft;
a plurality of core assemblies provided along a circumference of the rotor and defining a magnetic path;
a motor housing defining a first bearing housing, the first bearing housing supporting a first side of the shaft and accommodating the plurality of core assemblies, wherein the plurality of core assemblies are spaced apart from each other along the circumference of the rotor and are independently accommodated at the first bearing housing;
a housing cover coupled to the motor housing and defining a second bearing housing, the second bearing housing supporting a second side of the shaft;
an impeller configured to rotate about the rotation axis of the motor;
a diffuser coupled to the housing cover between the impeller and the rotor; and
a shroud accommodating the impeller and the diffuser and defining a suction part, the suction part being configured to introduce air,
wherein the motor housing includes:
a plurality of core supports accommodating the plurality of core assemblies independently,
a plurality of first bridges extending from the plurality of core supports toward a radially inner side of the shaft and connecting the plurality of core supports to the first bearing housing, and
a core support through hole defined at the plurality of core supports and configured to allow air to be discharged from an interior of the motor housing.

2. The motor assembly of claim 1, wherein the motor housing further includes a first coupler contacting the housing cover, the first coupler having a hollow ring shape, and wherein the plurality of core supports extend in a longitudinal direction of the shaft from the first coupler.

3. The motor assembly of claim 2, wherein first sides of the plurality of core supports contact the first coupler, and second sides of the plurality of core supports are connected to the first bearing housing through the plurality of first bridges.

4. The motor assembly of claim 2, wherein the housing cover includes:
a second coupler contacting the motor housing and having a hollow ring shape; and
a second bridge connecting an inner circumference of the second coupler to the second bearing housing.

5. The motor assembly of claim 4, wherein the second bridge extends from an inner circumference of the second coupler to the second bearing housing toward a radially inner side of the shaft.

6. The motor assembly of claim 5, wherein the housing cover is coupled to the motor housing and positioned at an upper portion between the plurality of core assemblies.

7. The motor assembly of claim 6, wherein the second bridge defines an inclined surface in a longitudinal direction of the shaft and is configured to guide at least part of air introduced through the suction part to the plurality of core assemblies.

8. The motor assembly of claim 1, wherein each of the plurality of first bridges includes a bridge through hole that defines a flow path configured to introduce air through the suction part and allow the air to pass through a respective one of the plurality of core assemblies.

9. The motor assembly of claim 8, wherein the bridge through hole is defined in a longitudinal direction of the each of the plurality of first bridges.

10. The motor assembly of claim 1, wherein each of the plurality of core assemblies includes:
a core including two pole arms and a connector connecting the two pole arms;
a coil; and
an insulator between the core and the coil.

11. The motor assembly of claim 10, wherein each of the plurality of core supports includes:
an accommodation groove that receives the insulator; and
a coupling groove that is recessed in a direction in which a width of the accommodation groove is widened, the coupling groove coupling the insulator.

12. The motor assembly of claim 11, wherein the insulator includes:
a fixing part inserted into the coupling groove in a longitudinal direction of the shaft.

13. The motor assembly of claim 12, wherein the coupling groove is defined in a longitudinal direction of the accommodation groove.

14. The motor assembly of claim 11, wherein the core support through hole includes a plurality of core support through holes,
wherein each of the plurality of the core support through holes is defined at each of the plurality of core supports.

15. A motor assembly comprising:
a shaft defining a rotation axis of a motor;
a rotor coupled to the shaft;
a plurality of core assemblies being spaced apart from each other along a circumference of the rotor and defining a magnetic path;
a motor housing connected to a first side of the shaft and accommodating the plurality of core assemblies independently;
a housing cover connected to a second side of the shaft and coupled to the motor housing;

an impeller configured to rotate about the rotation axis of the motor;

a diffuser coupled to the housing cover between the impeller and the rotor; and a shroud accommodating the impeller and the diffuser and defining a suction part, the suction part being configured to introduce air, wherein the motor housing includes:
- a first coupler coupled to the housing cover and having a hollow ring shape,
- a core support extending from the first coupler in a longitudinal direction of the shaft and supporting a corresponding one of the plurality of core assemblies,
- a first bearing housing positioned at a center of the motor housing and accommodating a first bearing, the first bearing being configured to support the shaft,
- a first bridge connecting the core support to the first bearing housing, and
- a core support through hole defined at the core support and configured to allow air to be discharged from an interior of the motor housing.

16. The motor assembly of claim 15, wherein the housing cover includes:
- a through hole that receives the shaft;
- a second bearing housing accommodating a second bearing, the second bearing being configured to support the shaft;
- a second coupler coupled to the first coupler; and
- a second bridge connecting the second coupler to the second bearing housing.

17. The motor assembly of claim 16, wherein the second bridge includes a plurality of second bridges and defines a predetermined slope in the longitudinal direction of the shaft.

18. The motor assembly of claim 15, wherein the motor housing includes a bridge through hole that is defined at the first bridge and configured to discharge air introduced into the shroud.

19. The motor assembly of claim 15, wherein the core support includes:
- an accommodation groove that accommodates a corresponding one of the plurality of core assemblies; and
- a coupling groove provided in a longitudinal direction of the accommodation groove and recessed in a direction in which a width of the accommodation groove is widened.

* * * * *